Oct. 13, 1931.    R. J. RADER    1,827,401
VELOCIPEDE TRAILER
Filed Nov. 21, 1930
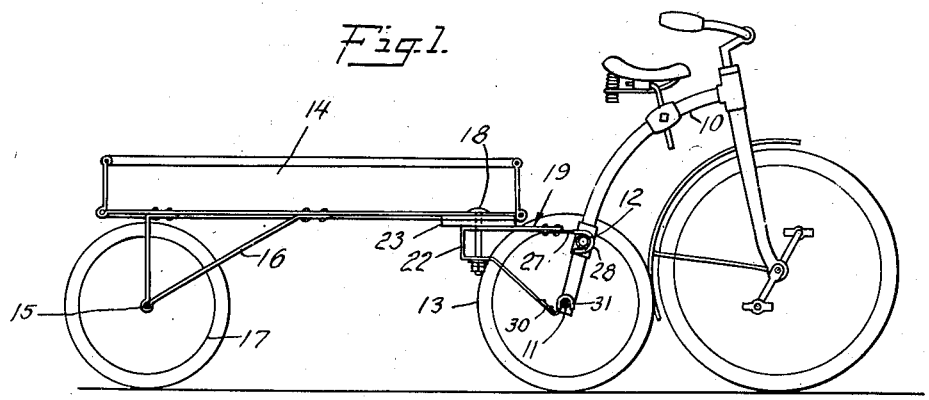
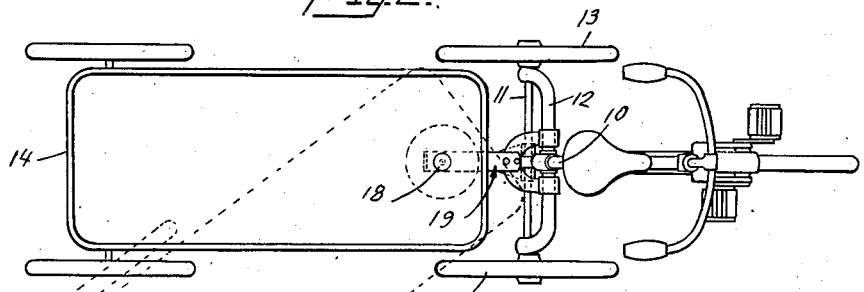
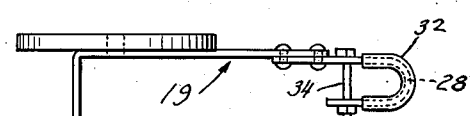
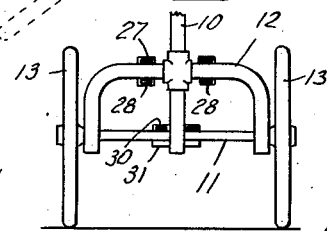
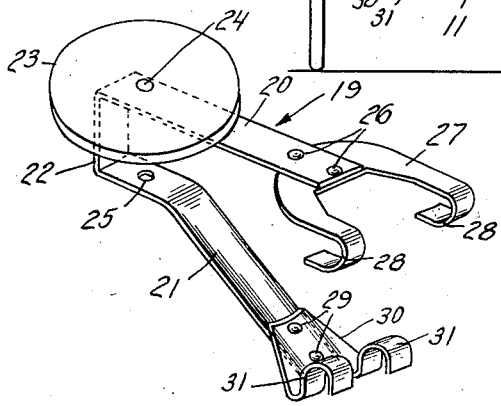
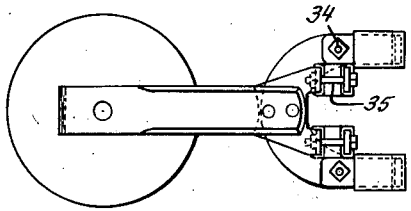
INVENTOR
Robert J. Rader
BY
Pearce Davis, Marvin Edmonds
ATTORNEYS Patented Oct. 13, 1931

1,827,401

UNITED STATES PATENT OFFICE

ROBERT J. RADER, OF NEW ROCHELLE, NEW YORK, ASSIGNOR TO J. C. PENNEY COMPANY, A CORPORATION OF DELAWARE

VELOCIPEDE TRAILER

Application filed November 21, 1930. Serial No. 497,181.

This invention relates to a velocipede trailer attachment and has particular reference to an arrangement whereby a toy wagon may be converted into a trailer for a velocipede.

Trailers for various kinds of vehicles have been provided heretofore, and among them are various forms of trailers for velocipedes, but these former types of trailers have been subject to many objections, principal among which is the fact that they were expensive additions to the velocipede and could not be used for any other purpose, and they were not readily attached to the velocipede nor permitted desirable freedom of movement and mobility because they were rigidly attached to the velocipede and did not turn readily.

The present invention utilizes not only a standard velocipede, but a standard toy wagon, known as an express wagon, as the primary elements, together with a conversion attachment whereby the express wagon may be converted into a trailer for the velocipede. This trailer has great mobility, is readily attached and detached without permanent change in the existing structures, and is relatively inexpensive inasmuch as both the express wagon and velocipede can be used separately without regard to the trailer function of the former, which is only employed when the wagon is to be used as such. Furthermore, with the present arrangement, the express wagon is provided with means for rapid locomotion and serves as a desirable conveyance for all kinds of articles which cannot be carried on a velocipede.

In the preferred embodiment of the invention just described, a conversion attachment consisting of a horizontal strut and a diagonal strut may be either temporarily or permanently attached to standard forms of velocipedes, the horizontal strut engaging the rear fork of the velocipede and the diagonal strut bracing the horizontal strut by engaging the rear axle of the velocipede. This attachment extends a considerable distance behind the velocipede and is preferably fitted with a bearing through which the king bolt of the express wagon passes after the front wheels of the wagon have been removed, the distance between the attached express wagon body and the velocipede frame assuring a wide turning angle for the trailer, so that the whole vehicle including the trailer may turn in a very small area.

It will be seen that, having a standard express wagon and a standard velocipede, it is only necessary to provide the simple conversion attachment described, in order to convert the express wagon into an effective trailer for the velocipede, but this conversion does not in any way destroy the individuality of either the express wagon or the velocipede, as the attachment can be detached as readily as its was attached from the velocipede and the front wheels remounted on the express wagon. Thus, by means of two standard toys and an attachment a third toy may be readily provided at small expense and inconvenience.

For a better understanding of the invention, reference is made to the accompanying drawings, in which Figure 1 is an elevation of the velocipede and trailer combination procured by this invention;

Fig. 2 is a plan view thereof showing the turning movement which the trailer has relatively to the velocipede;

Fig. 3 is a perspective view of the conversion attachment;

Fig. 4 is a fragmentary rear view of the velocipede showing how the conversion attachment is applied;

Fig. 5 is a side view of a modified form of the attchment; and

Fig. 6 is a bottom view thereof.

In these drawings, numeral 10 designates the frame of a standard velocipede, the rear end of this frame extending downwardly and being provided with an aperture through which the rear axle 11 passes. A rear fork 12 is secured to the frame 10 of the velocipede and its downwardly turned ends are provided with apertures through which the rear axle also passes, the rear wheels 13 being journalled on the axle 11 outside of the ends of the rear fork 12. As shown in Figs. 2 and 4, the rear fork extends laterally from the frame 10 and then is bent downwardly at approximately right angles to receive the ends of the axle, whereby a square shoulder-like arrangement of the rear fork is formed.

The express wagon is of the standard type consisting of a box-like body 14 having the rear axle 15 mounted in a bracket 16 and mounting the two rear wheels 17, while the front of the body 14 is provided with the king bolt 18 by which the front steerable wheels, not shown, are attached to the body 14 in the usual way.

The conversion attachment of this invention is shown in detail in Fig. 3 and preferably consists of a piece of strap iron 19 shaped so as to provide a horizontal tension strut 20, and a diagonal compression strut 21, which is preferably troughed to provide additional strength and rigidity. The connection between the diagonal strut or brace 21 and the horizontal strut 20 constitutes a journal box 22 provided at its upper end, that is, the upper surface of horizontal strut 20, with a bearing disc 23 having a central aperture 24 passing through it and the horizontal strut 20 and registering with the corresponding aperture 25 in the lower part of journal box 22 or horizontal portion of diagonal strut 21, this portion lying parallel to horizontal strut 20. The bearing disc 23 is preferably secured to the upper surface of horizontal strut 20 by welding or the like.

Secured to the free end of horizontal strut 20 by means of rivets 26, welding or the like, is a fork 27 preferably shaped of sheet metal, and having at its ends the two hooks 28 adapted to closely fit the rear fork 12 of the velocipede as shown in Figs. 1, 2 and 4. These two hooks are adapted to span the joint between the frame 10 and the fork 12 as shown particularly in Fig. 4.

Secured to the end of diagonal strut 21 by means of rivets 29, spot welding or the like, is a lower fork 30, whose ends are shaped with the hooks 31 adapted to closely fit over the rear axle 11 of the velocipede as shown particularly in Figs. 2 and 4. These hooks 31 are spaced apart, and are adapted to span the lower end of frame 10 where it joins the rear axle 11 as shown in Fig. 4. The hooks 28 and 31 are each preferably enveloped by rubber cushions 32 and 33, respectively, which may consist of short lengths of rubber tubing drawn over the corresponding hooks 28 and 31.

The hooks 28 and 31 of the conversion attachment 19 are open hooks, that is to say, they may be readily hooked and unhooked from the corresponding rear fork and rear axle of the velocipede and constitute a secure but more or less temporary attachment. In Figs. 5 and 6, the same attachment is shown in elevation and bottom views, but the hooks are provided with means for more rigidly securing the attachment to the velocipede frame. In this arrangement the ends of both hooks 28 and 31 are extended and are connected by respective bolts 34 and 35 to the upper strut 20 and lower strut 21. In securing the attachment to the frame, bolts 34 and 35 are removed, hooks 28 are slipped over the rear fork 12 of the velocipede, and hooks 31 are slipped over the rear axle 11 of the velocipede. Then the bolts 34 and 35 are replaced and tightened down, whereby the attachment 19 is rigidly secured to the velocipede.

In assembling the device of this invention, the attachment shown in Fig. 3 is hooked over the velocipede rear fork 12 and rear axle 11 in the manner described, the front wheels are removed from the express wagon, the body 40 thereof placed upon the bearing plate 23 so that its king bolt opening registers with the apertures 24 and 25 of the journal box 22 and the king bolt 18 is inserted through these apertures and its nut tightened down. The bearing plate 23 may be greased so that the trailer may turn readily relatively thereto as indicated in Fig. 2, this turning angle being wide by virtue of the fact that the trailer extends sufficiently behind the velocipede so that there is no interference between the body 14 and the velocipede as they turn relatively to each other in rounding curves or the like.

It will be seen that the trailer attachment of this invention provides a more simple and effective means for converting a standard velocipede and a standard express wagon into a third toy consisting of a velocipede and trailer combination, this third toy being readily procured by simply employing the attachment 19 shown in Fig. 3 as described. This toy is adapted to convey articles by the power provided by the velocipede, and can readily turn, move forwardly and backwardly, and give generally satisfactory performance. The conversion attachment will not tip laterally no matter how wide the turning angle between the trailer and the velocipede may be, this stability being secured by the wide spacing between upper hooks 28, which, together with the close spacing of lower hooks 31, procures a three-point support for the attachment 19. At any time, the trailer may be removed by detaching king bolt 18 and again converting it into an express wagon by remounting the front steering wheels and removing conversion attachment 19 from the velocipede to restore it to its original condition.

While a preferred embodiment of this invention has been illustrated and described herein, it is to be understood that this invention is not to be limited thereby, but is susceptible of various changes in form and detail within its scope.

I claim:

1. In a trailer attachment for a velocipede, the combination of a member mounted upon the rear of the velocipede and extending rearwardly of the rear wheels thereof, a trailer having at least two wheels, and a pivot connecting the trailer to the rear end of said member.

2. In a trailer attachment for a velocipede, the combination of a member mounted upon the rear of the velocipede and extending rearwardly of the rear wheels thereof, a strut for bracing said member on the velocipede, a bearing upon said member, and a trailer pivoted upon said bearing, whereby said trailer may turn relatively to the velocipede.

3. In a trailer attachment for a velocipede, the combination of a member mounted upon the rear fork of the velocipede, a brace on said member engaging the rear axle of the velocipede, and a trailer connected to said member and at least partially supported thereby.

4. In a trailer attachment for a velocipede, the combination of a member mounted upon the rear of the velocipede, a brace on said member engaging the rear axle of the velocipede, a trailer having a body, and a king bolt directly securing said trailer body to said member, whereby the trailer may turn relatively to the velocipede.

5. In a trailer attachment for a velocipede, the combination of a member mounted upon the rear fork of the velocipede, a brace on said member engaging the rear axle of the velocipede, a bearing upon said member, a trailer, and a king bolt securing said trailer to said bearing, whereby the trailer may turn relatively to the velocipede.

6. In a trailer attachment for a velocipede, the combination of a member mounted upon the rear fork of the velocipede, a brace on said member engaging the rear axle of the velocipede, a trailer, and a king bolt passing through said member and brace for connecting said trailer thereto.

7. In a trailer attachment for a velocipede the combintion of a member secured to the rear fork and to the rear axle of the velocipede and extending rearwardly a trailer having at least two rear wheels, and means connecting the front end of said trailer to said member, whereby the front of said trailer is supported by said member.

8. In a trailer attachment for a velocipede, the combination of a member secured to the rear fork of the velocipede and extending rearwardly, a brace thereon connected to the rear axle of the velocipede, a trailer having a least two rear wheels, and means connecting the front end of said trailer to said member.

9. In a trailer attachment for a velocipede, the combination of a member secured to the rear fork of the velocipede and extending rearwardly, said member being arranged substantially horizontally, a brace extending downwardly from said member to the rear axle of the velocipede, and a trailer pivoted to the rear end of said member.

10. In a trailer attachment for a velocipede, the combination of a member secured to the rear fork of the velocipede and extending rearwardly, said member extending substantially horizontally, a bearing plate on the free end of said member, a trailer having at least two rear wheels and resting at its front end upon said bearing, and king bolt passing through said bearing and a portion of said trailer, whereby the latter is turnable relatively to the velocipede.

11. In a trailer attachment for a velocipede, the combination of a rearwardly extending bracket having spaced clamps engaging the rear fork of the velocipede and a brace engaging the rear axle of the velocipede, a trailer having a body and at least two wheels, and means connecting the front end of said body to the rear end of said bracket.

12. In a trailer attachment for a velocipede the combination of a rearwardly extending member having hooks at one end for engaging the rear fork of the velocipede, a box formed at the rear end of said member, a brace extending downwardly from said box to the rear axle of the velocipede, a bearing plate on said box, a trailer having at least two wheels and a body resting upon said bearing plate, and a king bolt securing said body to said box, whereby the trailer may turn about said bearing relatively to the velocipede.

13. A device for mounting a trailer upon a velocipede, comprising a horizontal member having a hook adapted to engage the rear fork of a velocipede, a brace thereon having a hook adapted to engage the rear axle of the velocipede, and a bearing on said member adapted to pivotally mount the trailer.

14. A device for mounting a trailer upon a velocipede, comprising an upper member adapted to be secured to the frame of a velocipede and extend rearwardly therefrom, a lower member extending from the upper member, means for securing the lower member to the axle of the velocipede and means on at least one of the members for receiving the trailer.

In testimony whereof I affix my signature.

ROBERT J. RADER.